Dec. 13, 1938.  A. LYSHOLM  2,140,324

HYDRAULIC POWER DRIVE

Filed Feb. 6, 1935

INVENTOR.
Alf Lysholm

BY
Ivar S. Hedlund
his ATTORNEY.

Patented Dec. 13, 1938

2,140,324

UNITED STATES PATENT OFFICE 2,140,324

HYDRAULIC POWER DRIVE

Alf Lysholm, Stockholm, Sweden, assignor to Aktiebolaget Ljungstroms Angturbin, Stockholm, Sweden, a corporation of Sweden Application February 6, 1935, Serial No. 5,193
In Germany February 12, 1934

9 Claims. (Cl. 60—54)

The present invention relates to hydraulic power drives and has particular reference to drives of this character for transmitting power from a source such as an internal combustion engine, steam turbine or the like to a useful power shaft at variable speed and selectively in opposite directions of rotation.

The power drive contemplated by the present invention is particularly applicable for connecting the power plant of a marine vessel to the propeller shaft thereof and will be described in connection with such an installation although it is to be understood that the invention is not limited to this use.

In general the principal object of the invention may be said to provide a simple and easily controlled power drive of the character described which will permit variable speed drive to be obtained and which will further permit reverse drive to be readily obtained, without the necessity for incorporating in the drive the complications and disadvantages of gear trains and other mechanical devices of like nature and which will further permit of the substantially instantaneous reversal of drive from forward to reverse and vice versa.

For a better understanding of the nature of the invention together with the advantages to be derived from its use, I will now describe the construction and operation of a suitable construction example of the invention in its application.

In the accompanying drawing illustrating the structure to be described:

Fig. 1 is a more or less diagrammatic side elevation partly in section of the hydraulic drive;

Fig. 2 is a side elevation of a portion of the mechanism shown in section in Fig. 1; and Fig. 3 is a section taken on the line 3—3 of Fig. 2.

Referring now more particularly to Fig. 1 reference numeral 10 indicates a source of power such, for example, as an internal combustion engine, steam turbine or the like, having a power shaft 12 constituting a power input shaft for the hydraulic drive.

Coupled to shaft 12 by means of any suitable permanent coupling is the hydraulic power transmission or torque converter indicated generally at 14 which transmission is adapted to transmit power in one direction only, at variable speed, and which also advantageously is adapted to operate as a torque converter for multiplying the torque when the driven member of the transmission is turning at a speed substantially less than the speed of the power input shaft. This type of hydraulic transmission is particularly suited for effecting power drive to a shaft such as a propeller shaft, from a prime mover or other source of power adapted to operate most efficiently at constant speed.

The hydraulic transmission illustrated, by way of example, is of the type disclosed in United States Patent No. 1,900,118 granted to me March 7, 1933, and reference may be had to said patent for details of construction thereof. It will be understood, however, that the present invention is not limited to the use of this particular form of hydraulic transmission or torque converter.

The transmission 14 comprises a stationary casing 16 mounted upon a suitable pedestal 18 and providing a main working chamber 20 for the power transmitting fluid. The driving or power input member 22 of the transmission, which I will term an impeller member, comprises a shaft part 24 rotatably mounted in the casing 16 and connected to shaft 12, and an impeller or pump part located in the chamber 20 and carrying a ring of pump or impeller blades 26.

The driven end of the transmission is formed by a turbine or impelled member 28 comprising a driven shaft part 30 and a turbine part carrying the three rings of turbine blades 32, 34 and 36. The stationary casing 16 carries two rings of stationary guide blades 38 and 40 interposed between the rings of turbine blades.

The driven shaft 30 of the transmission 14 is connected by means of a coupling 42 to an intermediate shaft 44 which extends axially through the center of a hydraulic reversing mechanism indicated generally at 46. This mechanism is supported by pedestals 48 and 50. The casing of the reversing mechanism comprises a housing part 52 having a hollow shaft portion rotatably mounted in the journal bearing 54 of pedestal 50, and a casing part 56 having a hollow shaft part rotatably mounted in the journal bearing 58 in pedestal 48. These casing parts form between them a working chamber 60 for the operating fluid. Shaft 44 passes through the hollow shaft part of the casing member 56 and is journalled therein at 62. Fixed to shaft 44 in the chamber 60 is the impeller or pump member 64 of the reversing mechanism carrying a ring of pump blades 66. The driven or impelled member of the reversing mechanism comprises a hollow shaft part 68 journalled at 70 in the hollow shaft part of the casing 52 and an impelled part 72 carrying a ring of turbine blades 74. The casing member 52 has fixed therein a ring of guide blades 76 arranged to reverse the direction of flow of fluid discharge from the pump blades 66 before it enters the blades 74 of the impelled part of the apparatus.

At its right-hand end shaft 44 is reduced in diameter to provide a portion 44a journalled at 78 and 80 in the hollow shaft part 68 of the impelled member. The shaft parts 68 and 44a extend through the bearings in the pedestal 50 and are connected to different parts of a releasable coupling indicated generally at 82. In the example illustrated this releasable coupling is in the form of a friction clutch of the disc type. It will be understood, however, that other forms of releasable coupling may be employed within the scope of the invention. Coupling 82 comprises a cylindrical box-like housing 84 constituting the driven part of the coupling and a driving hub 86 carrying the clutch plates 88, these parts constituting the driving part of the coupling. Hub 86 is fixed to the end of the portion 44a of the intermediate shaft 44 and the driven part 84 of the coupling is fixed to the end of the shaft part 68 of the impelled member of the reversing mechanism. The driven part of the coupling terminates in a shaft portion 90 connected by means of a suitable coupling 92 to the useful power or driven shaft 94 which in the embodiment shown is indicated as being the propeller shaft of a ship upon which is mounted the propeller 96. Shaft 94 may be supported by one or more pedestal bearings one of which is shown at 98.

The clutch plates 88 are adapted to be engaged or released between plates 100 which are mounted in the casing 84 so as to be movable axially but not rotationally with respect to the casing. These plates are movable to exert or release engaging pressure on the clutch plates by means of clutch shifting mechanism of the ordinary type which, in the present instance, comprises a plurality of levers 102 pivotally mounted on pins 104 carried by the casing and actuating pins 106 passing through the casing to engage one of the pressure plates 100. The inner ends of the levers 102 are located in a groove 108 in a sliding clutch actuating member 110 which carries a rotational stationary shifting ring 112 provided with a groove 114 receiving the forked ends of a shifting lever 116.

Referring now particularly to Figs. 2 and 3 it will be seen that the casing member 52 of the reversing mechanism is provided with cylindrical brake shoe portion 118 adapted to be engaged by a brake shoe which in the form illustrated comprises a friction band brake 120, one end, 122, of which is fixed to any suitable stationary support and the other end, 124, of which is adapted to be moved to engage or release the brake.

The brake mechanism just described is advantageously interconnected with the releasable coupling and by way of example I have shown these parts connected by a linkage as shown in Figs. 2 and 3. This linkage comprises the shift fork 116 fixed to a cross shaft 126. Shaft 126 is journalled in fixed bearings 128 and has pinned thereto the control lever 130 and also arm 132 which is connected by means of link 134 to one arm of the bell-crank 136 pivotally mounted in the fixed support 138. The other arm of the bell-crank is connected by means of link 140 to the end 124 of the brake band 120.

Turning again to the transmission 14 and the reversing mechanism 46 it will be observed that the hollow shaft part of the casing member 56 of the reversing mechanism which is journalled in the pedestal 48 is provided with a channel 142 communicating at one end with the bearing cap 144 and at the other end with the space 146 between the part 64 and the casing part 56. This space is in turn in communication with the interior of the chamber 60. The shaft 44 and the shaft part 30 are provided with central communicating bores 148 and 150, bore 148 being in communication by means of the radial bore 152 with the chamber 60 of the reversing mechanism and bore 150 being in communication by means of the radial bore 154 with the chamber 20 of the transmission.

The inlet end of the bore 142 is in communication with a source of pressure fluid and in the present apparatus I have shown by way of example a pump 156 driven by means of gears 158 from the power input shaft 12, this pump having an inlet 160 for oil or other suitable operating fluid and delivering this fluid under pressure through the pipe 162 to the passage 142.

The operation of the apparatus is as follows:

Let it be assumed that the control lever 130 is in a position such that the brake on the casing of the hydraulic mechanism is released and the coupling 82 is engaged. By reference to the drawing it will be seen that the linkage illustrated is arranged so that the brake and the coupling are engaged alternatively, the one being released while the other is engaged and vice versa. It is further assumed that both chamber 20 and chamber 60 are filled with operating fluid such as oil or water. Under these conditions rotation of the power input shaft causes the impeller member of the transmission to circulate operating fluid in chamber 20 in the direction indicated by the arrow and power is transmitted at variable speed to impelled member 28 due to such circulation of the operating fluid through the several rings of turbine blades. The operating characteristics of the hydraulic transmission are fully described in the aforementioned patent, No. 1,900,118, and need not be described herein in detail. It is to be noted, however, that in this apparatus the impelled member always rotates in the same direction as the impeller member.

Assuming the impelled member of the transmission to be rotated due to the application of power to the transmission, drive is effected directly from the transmission to the propeller 96 through shaft 44, the engaged driving and driven parts of the coupling 82 and shaft 94. This condition of drive constitutes forward drive and under this condition the impeller member of the reversing mechanism, being fixed to shaft 44, rotates therewith and the impelled member of the reversing mechanism, being fixed to the driven part 84 of the coupling, also rotates at the same speed and in the same direction.

Rotation of these parts of the reversing mechanism is possible because of the fact that the casing is free to rotate owing to the released condition of the brake 120 and this casing together with the reversing guide blades 76 also rotates with the impeller and impelled members of this device. It will be evident that under these conditions the entire reversing mechanism rotates as a unit with little, if any, relative motion between the several parts thereof. Consequently no appreciable power loss is involved because of the reversing mechanism when the parts are in forward drive, even though the reversing mechanism is positively and continuously connected to the direct drive parts.

In order to effect reverse the control lever 130 is shifted so as to cause engagement of the brake 120 and disengagement of the coupling 82. Under this condition of drive and assuming the shaft 44 to be rotated in the same or forward direction of rotation, no power is transmitted directly from shaft 44 to the driven shaft 94 because of the disengagement of coupling 82. The impeller member of the reversing mechanism continues to rotate with shaft 44, but the locking of the casing of the reversing mechanism by the brake 120 causes the fluid discharged from the pump blades 66 to be reversed in its direction of flow whereby to cause the impelled member of this mechanism to rotate in a direction opposite the direction of rotation of blades 66. It will be understood of course that blades 74 are designed so as to produce this reverse direction of rotation when acting in conjunction with the stationary guide blades 76. The drive in reverse direction is carried from the impelled member of the reversing mechanism through the housing or driven part 84 of the coupling to the driven shaft 94 to produce the reverse drive.

From the foregoing it will be evident that the above described mechanism is capable of providing hydraulic variable speed drive to a driven shaft for rotation thereof in either direction and it will be further evident that shifting of the direction of drive may be substantially instantly secured without shock and with control mechanism of the utmost simplicity. While it is preferable to have controls for the coupling and the brake interconnected, it will of course be evident that separate controls may be employed so that if desired the coupling can be disconnected before the brake is applied to the reversing mechanism in order to secure drive in reverse direction. When the two are interconnected as shown it will of course be obvious that the adjustment should be such that the coupling is disconnected prior to full application of the brake so as not to unduly strain the mechanism.

It is further to be observed that with the arrangement described, in which the working chambers of both of the hydraulic units are maintained continuously filled with operating fluid no time lag is involved in shifting from forward to reverse drive or vice versa because of the necessity for filling or emptying either of these working chambers to throw either of the hydraulic units into or out of action. This is important, particularly in marine drives, where rapid shifting from forward to reverse and vice versa is frequently necessary in order to safely manoeuvre the vessel in which the drive is installed.

Many changes and variations in the specific form and arrangement of the apparatus may be made within the scope of the invention which is to be understood as embracing all forms of apparatus falling within the scope of the appended claims.

What I claim is:

1. A power drive including a hydraulic transmission for transmitting power in one direction only, a hydraulic reversing mechanism for reversing the direction of drive from said transmission to a driven element, said transmission and said reversing mechanism each having a working chamber and impeller blades and impelled blades located in said chamber, means for maintaining said chambers filled with operating fluid under all conditions of drive and means for selectively rendering said hydraulic reversing mechanism inoperative to transmit power.

2. A power drive including a hydraulic transmission for transmitting power in one direction only, a hydraulic reversing mechanism for reversing the direction of drive from said transmission to a driven element, said transmission and said reversing mechanism each having a working chamber for operating fluid and each having an impeller member and an impelled member located in such working chamber, and means for maintaining said working chambers filled with operating fluid under all conditions of drive.

3. A power drive for selectively transmitting power in forward and reverse directions from a power plant to a driven shaft including a hydraulic transmission receiving power from said power plant and transmitting power in forward direction only, a releasable coupling for transmitting power in forward direction from said transmission to said driven shaft and hydraulic reversing mechanism for transmitting power in reverse direction from said transmission to said driven shaft, said reversing mechanism including a rotatably mounted part requiring to be held against rotation to render the reversing mechanism operative, and means selectively operable to hold said part against rotation.

4. A power drive for selectively transmitting power in forward and reverse directions from a power plant to a driven shaft including a hydraulic transmission receiving power from said power plant and transmitting power in forward direction only, mechanical means including a frictionally engaged releasable coupling for transmitting power in forward direction from said transmission to said driven shaft, and hydraulic reversing mechanism for transmitting power in reverse direction from said transmission to said driven shaft, said reversing mechanism including a rotatably mounted part requiring to be held against rotation to render the reversing mechanism operative and means selectively operable to frictionally engage said part to hold it against rotation.

5. A power drive for selectively transmitting power in forward and reverse directions from a power plant to a driven shaft including a hydraulic transmission receiving power from said power plant and transmitting power in forward direction only, means providing a connection for transmitting power to said driven shaft in forward direction including a releasable coupling, hydraulic reversing mechanism comprising parts arranged to rotate freely as a unit with said means when in forward drive, and means for releasing said coupling and stopping rotation of certain of the parts of said hydraulic mechanism to effect drive to said driven shaft in reverse direction.

6. In a hydraulic drive, a power shaft for transmitting power in one direction of rotation only, a driven shaft, a releasable coupling having a driving part fixed to rotate with said power shaft and a driven part fixed to rotate with said driven shaft, hydraulic reversing mechanism comprising a rotatably mounted casing providing a chamber for working fluid, an impeller member fixed to rotate with said power shaft and having pump blades in said chamber, an impelled reversing member fixed to rotate with the driven part of said coupling, guide blades fixed to said casing for causing reverse rotation of said impelled member with respect to said impeller member when said casing is stationary and means for selectively permitting rotation of said casing or preventing it from rotating.

7. A reversible power drive including a hydraulic transmission having a power output shaft for drive in one direction, a driven shaft, releasable coupling means for connecting said shafts together for forward drive, and hydraulic reversing mechanism for transmitting power in reverse direction from said output shaft to said driven shaft, said mechanism including a rotatable part requiring to be held against rotation to render the reversing mechanism operative and releasable means to hold said part against rotation.

8. A power drive including a hydraulic transmission having a power output shaft for drive in one direction, a driven shaft and a hydraulic reversing mechanism for driving said driven shaft in reverse direction including a casing, an impeller member within said casing and connected to said output shaft, an impelled member within said casing and connected to said driven shaft and means for maintaining said casing filled with operating fluid under all conditions of drive.

9. A power drive including a hydraulic transmission having a power output shaft for drive in one direction, a driven shaft and a hydraulic reversing mechanism for driving said driven shaft in reverse direction including a casing, an impeller member within said casing and connected to said output shaft, an impelled member within said casing and connected to said driven shaft, guide blades fixed within said casing between said impeller and impelled members and means for maintaining said casing filled with operating fluid under all conditions of drive.

ALF LYSHOLM.